United States Patent [19]

Holsztynski et al.

[11] Patent Number: 4,524,455
[45] Date of Patent: Jun. 18, 1985

[54] PIPELINE PROCESSOR

[75] Inventors: Wlodzimierz Holsztynski; Stephen S. Wilson, both of Ann Arbor, Mich.

[73] Assignee: Environmental Research Inst. of Michigan, Ann Arbor, Mich.

[21] Appl. No.: 269,143

[22] Filed: Jun. 1, 1981

[51] Int. Cl.³ ............................................. G06K 9/36
[52] U.S. Cl. .................................... 382/41; 364/200; 382/49
[58] Field of Search ... 364/200 MS File, 900 MS File, 364/736; 382/41, 49

[56] References Cited

U.S. PATENT DOCUMENTS

| | | | |
|---|---|---|---|
| 3,287,702 | 11/1966 | Borck et al. | 364/200 |
| 3,287,703 | 11/1966 | Slotnick | 364/200 |
| 3,296,426 | 1/1967 | Ball | 364/200 |
| 3,308,436 | 3/1967 | Borck et al. | 364/200 |
| 3,312,943 | 4/1967 | McKindles et al. | 364/200 |
| 3,473,160 | 10/1969 | Wahlstrom | 364/900 |
| 3,544,973 | 12/1970 | Borck et al. | 364/200 |
| 4,174,514 | 11/1979 | Sternberg | 382/49 |
| 4,215,401 | 6/1980 | Holsztynski et al. | 364/200 |
| 4,301,443 | 11/1981 | Sternberg et al. | 382/49 |

Primary Examiner—Leo H. Boudreau
Attorney, Agent, or Firm—Krass & Young

[57] ABSTRACT

A system particularly suited for serially processing spatially oriented data such as data matrices includes a plurality of serially connected processing cells for performing a number of successive, different operations on the data using pipeline processing techniques. In one embodiment, each unit cell comprises a memory in the form of a shift register for storing data received from the neighboring, upstream cell. The data is transferred from the memory to a time delaying storage medium such as a latch and to a processing circuit which operates on the data and provides data output to the neighboring, downstream cell. In another embodiment, a simple parallel-in, parallel-out latch is employed as the cell memory thereby allowing the processing circuit to simultaneously access all of the data stored in memory. Data is output from the latch in pre-determined groups and is multiplexed to one portion of the processing circuit. One of the data groups output from the latch is delayed by a shift register and then delivered to another portion of the processing circuit which selectively receives data from the first portion. A central controller connected to each cell controls the transfer of data within and between the cells.

21 Claims, 5 Drawing Figures

PIPELINE PROCESSOR

TECHNICAL FIELD

The present invention generally relates to data processing and deals more particularly with systems for serially processing data through a chain of processing cells.

BACKGROUND ART

The data processing technique in which data is sequentially processed by a plurality of serially connected processing stages is known as chain or pipeline processing. This technique allows for a number of different operations or instructions to be executed simultaneously and is therefore quick in many applications.

Pipeline processing has previously been employed in connection with the processing of digital image data for the purpose of analyzing satellite pictures, image enhancement of pictures taken from space probes, etc. In fact, a two dimensional array of synchronized processors has been suggested for use as a pipeline for processing successive images or sections of one image, to achieve increased processing speed. Once each microprocessor performs a computational cycle for the information for one image, it becomes immediately available to perform a computation cycle for information for another image. Additional background information concerning array processing of digital image data may be found in our U.S. Pat. No. 4,215,401, issued July 29, 1980.

Known prior art unit cells employed in pipeline processing systems are limited in the type of data transformations which can economically be performed. A greater number of possible cell operations requires considerably more hardware, thus making complex data transformations particularly costly.

It is therefore a primary object of the present invention to provide a pipeline processing system in which a maximum number of types of data operations may be performed, thereby increasing the number of transformations which can be carried out, while significantly reducing the amount, and therefore cost, of hardware comprising each unit cell.

A further object of the present invention is to provide a processor of the type described above which is significantly faster in operation than systems heretofore employed.

A still further object of the invention is to provide a pipeline processor suitable for performing complex transformations on a data matrix.

Another object of the invention is to provide a unit cell for use in a serial chain thereof forming a pipeline processor which is particularly simple in construction and which is readily adaptable to be embodied in an integrated micro-circuit.

These and further objects of the invention will be made clear or will become apparent during the course of the following description.

DESCRIPTION OF THE INVENTION

A system particularly suited for serially processing spatially oriented data such as data matrices includes a plurality of serially connected processing cells for performing a number of successive, different operations on the data using pipeline processing techniques. Each chain of the pipeline processor comprises a plurality of individual, serially connected unit cells which perform distinct operations on data delivered therethrough. A plurality of the chains of unit cells may be interconnected in parallel to allow complex transformations to be performed on matrix type data. In one embodiment, each unit cell comprises a memory in the form of a shift register for storing data received from the neighboring upstream cell. Data is transferred from a memory to a time-delaying storage medium such as a latch and to a processing circuit comprising an OR gate which operates on the data and provides data output to the neighboring downstream cell. In another embodiment, a simple, parallel-in, parallel-out latch is employed as the cell memory in order to allow the processing circuit to simultaneously access all of the data stored in the memory. Data is output from the latch in pre-determined groups which is then multiplexed to one portion of the processing circuit; one of the data groups output from the latch is delayed by a shift register and then delivered to another portion of the processing circuit which selectively receives the data from the first portion and outputs data to the neighboring, downstream cell. A central controller connected to each cell controls the transfer of data within and between the cells.

BRIEF DESCRIPTION OF THE DRAWINGS

In the drawings, which form an integral part of the specification and are to be read in conjunction therewith, and in which like reference numerals are employed to designate identical components in the various views.

BEST MODE FOR CARRYING OUT THE INVENTION

Figure 1:
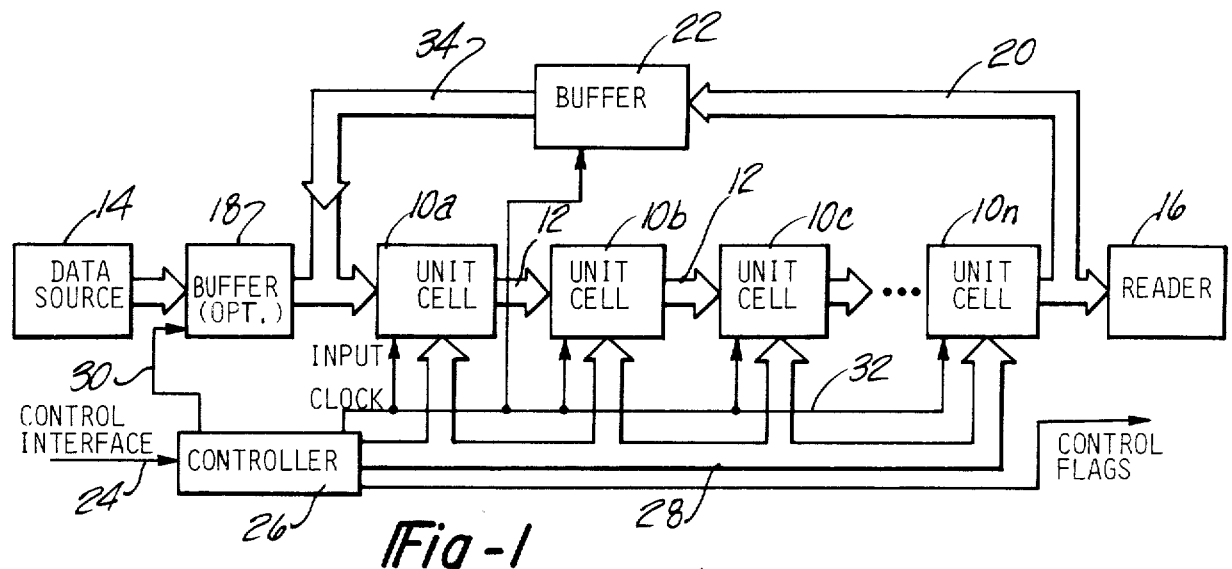
FIG. 1 is a block diagram of the pipeline processor forming the preferred embodiment of the present invention.

Referring first to FIG. 1, the pipeline processor of the present invention comprises a plurality of individual, identical unit cells 10a-10n serially connected in a chain thereof by a data bus 12, and each adapted to operate on incoming data received from the upstream cell 10a in accordance with instructions derived from a controller 26 received on instruction bus 28. The unit cells 10a-10n are operated in synchronization with each other by virtue of a clock signal delivered on line 32 from the controller 26. Controller 26 is operated by a control interface 24 which may comprise a set of programmed instructions derived from a computer, or input device such as a terminal or the like.

The data to be processed is derived from a data source 14 and is delivered in the form of a stream of N-bit words to a buffer 18 whose operation is controlled by the controller 26 via control line 30. The first upstream unit cell 10a receives each N-bit word from the buffer 18 and performs the desired operation on such word in accordance with a stored instruction previously received from the controller 26. The altered data word is then delivered by data bus 12 to the next-in-line, downstream cell 10b which further operates on the altered data word in accordance with a stored instruction previously received from the controller 26. The operation performed by the second downstream unit cell 10b may be the same as or different from that formed by the first upstream unit cell 10a. While the second unit cell 10b is operating on an altered data word the first upstream unit cell 10a receives another N-bit data word and immediately begins processing the same. This processing sequence continues with the altered data word being transferred to the next downstream unit cell 10 until the data word is output from the last downstream unit cell 10n to a writer or display 16, or optionally, to an output buffer 22 via data bus 20 for temporary storage. Data temporarily stored in buffer 22 may be then delivered via data bus 34 to the input of the first unit cell 10a for further processing.

Figure 2:
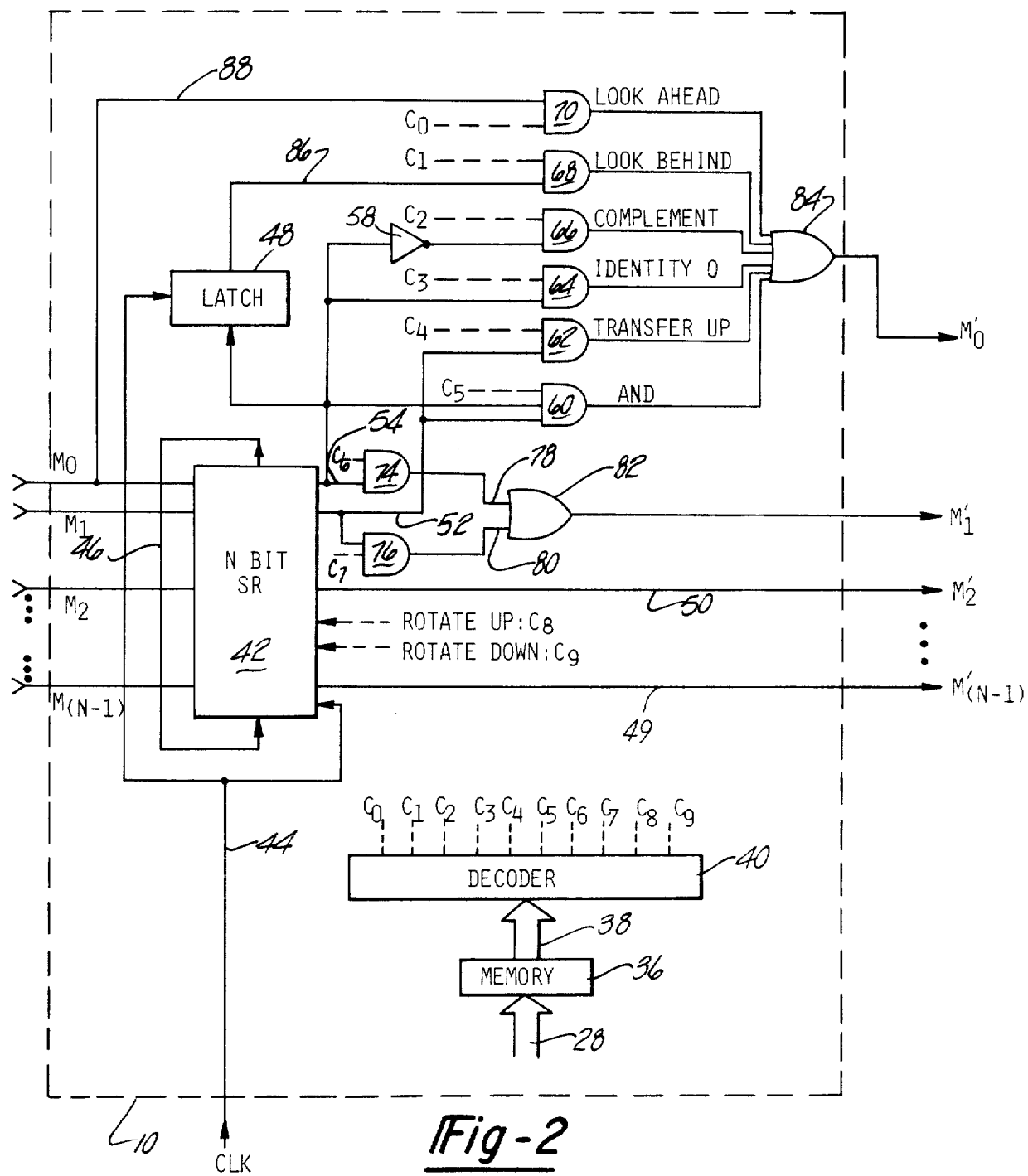
FIG. 2 is a combined schematic and block diagram of one of the unit cells of the pipeline processor of FIG. 1.

Turning now to FIG. 2, the typical construction for one of the unit cells shown in FIG. 1, is depicted in more detail within the broken line at 10 in FIG. 2. A set of coded instructions unique to each particular unit cell 10 is stored in a memory 36 which is controlled by signals received on bus 28. Coded commands corresponding to the stored instructions are delivered on bus 38 to a decoder 40 which decodes the commands and produces a set of signals on command lines $C_0$ through $C_9$ comprising high or low signal states. Command lines $C_0$–$C_9$ are connected to various other components of the unit cell 10, as will become apparent hereinafter, and function to control both inter-cell and intra-cell transfer of data.

The cell 10 includes a memory element 42 comprising an N-bit parallel-in, parallel-out, bidirectional shift register, such as that manufactured by th RCA Corporation and identified by the Manufacturer's No. 4034A. Memory element 42 has a plurality of parallel input lines $M_0, M_1, M_2, \ldots M_{(N-1)}$, and a plurality of data output lines 49. Memory element 42 is of the "end around barrel shifter" type in which data received on lines $M_0$–$M_{(N-1)}$ is stored and sequentially shifted therewithin until delivered to an output position for delivery on lines 50–54. Data words not desired to be output on lines 50–54 are shifted past the output position within memory element 42 and are returned in stacked order via return line 46 to the bottom of the stack storage locations in memory element 42. Thus, it is apparent that in order to output a particular data word from memory element 42 such data word must be successively shifted in a serial fashion between storage locations until it arrives at the output position, whereupon the desired data word may be output in parallel fashion on lines 50–54. Data transfer into and out of the memory element 42 is controlled by a source of clock pulses derived on line 44. The memory element 42 further includes a pair of controlled inputs respectively connected to command lines $C_8$ and $C_9$, for controlling the transfer of data into and out of memory element 42. Memory element 42 further includes additional output lines $M'_2$ up to $M'_{(N-1)}$ which form further outputs of the unit cell 10 and are operably connected with the $M_2$ through $M_{(N-1)}$ input lines of the memory element 42 of the neighboring, downstream unit cell 10.

Data output line 52 forms one input of AND gates 60, 62 and 76, further inputs to said gates respectively comprising command lines $C_5$, $C_4$ and $C_7$. The output of AND gate 76 is delivered via line 80 to one input of OR gate 82, a second input thereto being formed by the output of an AND gate 74 via line 78. The output of OR gate 82 forms an output data line $M'_1$ of the unit cell 10, which in turn forms the $M_1$ input of the neighboring, downstream unit cell. AND gate 74 has one input thereof connected to command line $C_6$, the other input thereto being formed by output line 54 of the memory element 42. The output of memory element 42 on line 54 is also delivered to a data input of a latch 48, as well as to inputs of AND gates 60 and 64 as well as to the input of gate 66 via inverter 58. AND gates 64 and 66 also have inputs respectively connected to command lines $C_3$ and $C_2$.

Latch 48 is controlled by clock pulses derived on line 44 and is operative to receive data on line 54 into storage therein, thereby temporarily holding such data until the occurrence of a subsequent clock signal on line 44. Data in latch 48 is then clocked out on line 86 to one input of AND gate 68, the second input thereto being formed by command line $C_1$.

Input data line $M_0$, in addition to forming one data input of memory element 42, is coupled via line 88 to one input of AND gate 70, a second input thereto being formed by command line $C_0$. The output of AND gates 60–70 form inputs to OR gate 84, the output of OR gate 84 forming the output line $M'_0$ of the unit cell 10. The data output on output lines $M'_0$ and $M'_1$ depend on the signals present on command lines $C_0$–$C_9$.

As indicated previously, the various possible operations of the unit cell 10 are determined by the specific conditions of the nine command lines $C_0$–$C_9$. The action commanded by a signal on a particular control line, when signals are absent on the remaining control line, are as follows:

$C_0$: "look ahead"—data present on input line $M_0$ is transferred to output line $M'_0$, thus directly transferring received data to the neighboring, downstream unit cell.

$C_1$: "look behind"—data output on line 54 and stored in latch 48 for one clock pulse is delivered through gates 68 and 84 and is delivered to the neighboring downstream unit cell on output line $M'_0$.

$C_2$: "complement"—the logical compliment of data output from memory element 42 on line 54 is transferred to the neighboring, downstream unit cell through inverter 58, and gates 66 and 84 thence, on output line $M'_0$.

$C_3$: "identity 0"—data output from memory element 42 on line 54 is delivered through gates 64 and 84 to output line $M'_0$ for delivery to the neighboring, downstream unit cell.

$C_4$: "transfer up"—data output from memory element 42 on line 52 is delivered through gates 62 and 84 to output line $M'_0$ for delivery to the neighboring, downstream unit cell.

$C_5$: "AND"—the logical AND of data present on line 54 with data present on line 52 is delivered through gates 60 and 84 to output line $M'_0$ for delivery to the neighboring, downstream unit cell.

$C_6$: "transfer down"—data on line 54 output from memory element 42 is transferred through OR gate 82 to the neighboring, downstream unit cell via output line $M'_1$.

$C_7$: "identity $M_1$"—data output from memory element 42 on line 52 is transferred directly through OR gate 82 to the neighboring, downstream unit cell via output line $M'_1$.

$C_8$: "rotate up"—data words present in the memory element 42 are shifted upwardly to adjacent storage locations.

$C_9$: "rotate down"—data words within the memory element 42 are shifted downwardly between adjacent storage locations therein.

In the event that more than one of the command lines $C_0$-$C_9$ has a command signal thereon, the output lines $M'_0$ and $M'_1$ will transfer the logical OR function of the above mentioned actions to the neighboring downstream unit cell via OR gates 82 and 84.

It is thus apparent that a wide variety of transfer operations can be formed using combinations of signals on command lines $C_0$-$C_9$. For example, the following operations are typically available:

1. "Rotate up"—the presence of the signal on command line $C_9$, followed by simultaneous signals present on command lines $C_3$ and $C_7$ results in data words being shifted out of memory element 42 onto lines 52 and 54 for delivery to AND gates 64 and 76, thence to the downstream processing cell on output lines $M'_0$ and $M'_1$.
2. "Interchange"—signals simultaneously present on command lines $C_4$ and $C_6$ interchanges the order of two data bits.
3. "Complement"—simultaneous signals present on command lines $C_2$ and $C_7$ after a signal on command line $C_9$ results in an operation similar to operation 1 above except that the logical complement is output on $M'_0$.
4. "0"—a signal on command line $C_7$.
5. "AND"—simultaneous signals on command lines $C_5$ and $C_7$.
6. "Shift East"—signals are simultaneously present on command lines $C_0$ and $C_7$.
7. "Shift West"—simultaneous signals are present on command lines $C_1$ and $C_7$.

For a discussion of the significance of the operations referred to immediately above reference may be made to our earlier co-pending application mentioned above.

Figure 3:
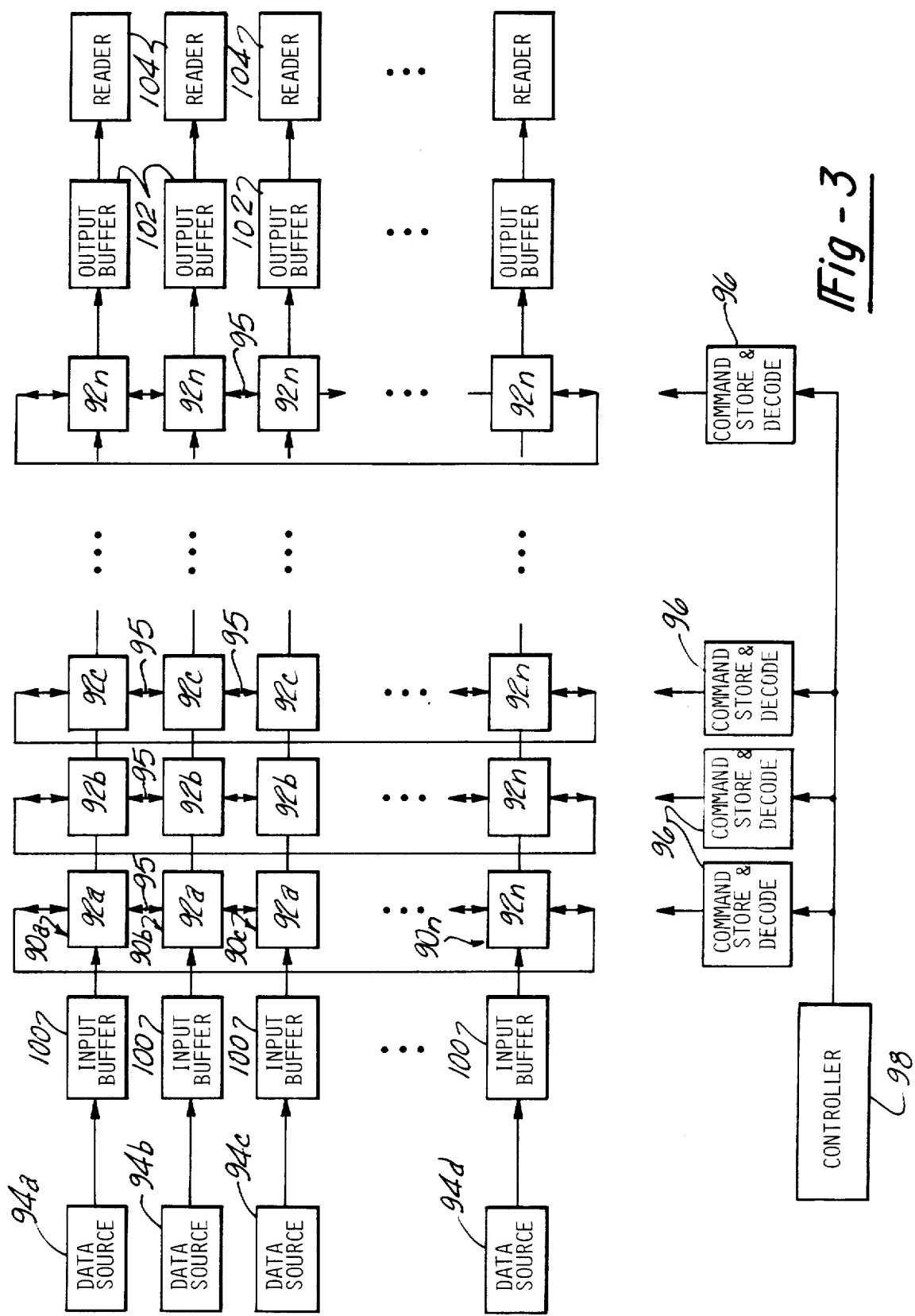
FIG. 3 is a block diagram of an alternate embodiment of the pipeline processor of the present invention.

The pipeline processing of the present invention may be advantageously employed to process a plurality of parallel streams of data using an alternate form of unit cell. As shown in FIG. 3, a plurality of chains 90a, 90b, 90c, 90n, each including a plurality of serially connected unit cells 92a-92n, each serially process independent sources of data 94a, 94b, 94c, and 94n. The unit cells 92 are arranged in associated columns and are interconnected by bidirectional data busses, as at 95, to allow the transfer of data therebetween. Since the unit cells 92 in each vertical row thereof perform the same operations on the data, a single decoder and memory 96, similar to memory 36 and decoder 40 previously discussed with reference to FIG. 2, is operably coupled with the unit cells 92 in each row thereof, rather than providing each unit cell with memory and decoder. The memory and decoder 96 is operated by a controller 98, similar to the controller 26 previously described.

In operation, a stream of data words supplied by data sources 94 are delivered to input buffers 100, thence to the data input of the first upstream unit cells, as at 92a. Operations are then sequentially performed on the data by the unit cells 92a-92n in each chain 90 thereof, and the altered data is finally delivered to output buffer 102, thence to a display 104 or the like. Information may be transferred on line 95 between the unit cells of adjacent chains 90 thereof in order to perform data transformations on data matrices, similar to those described in our prior co-pending application mentioned above.

Figure 4:
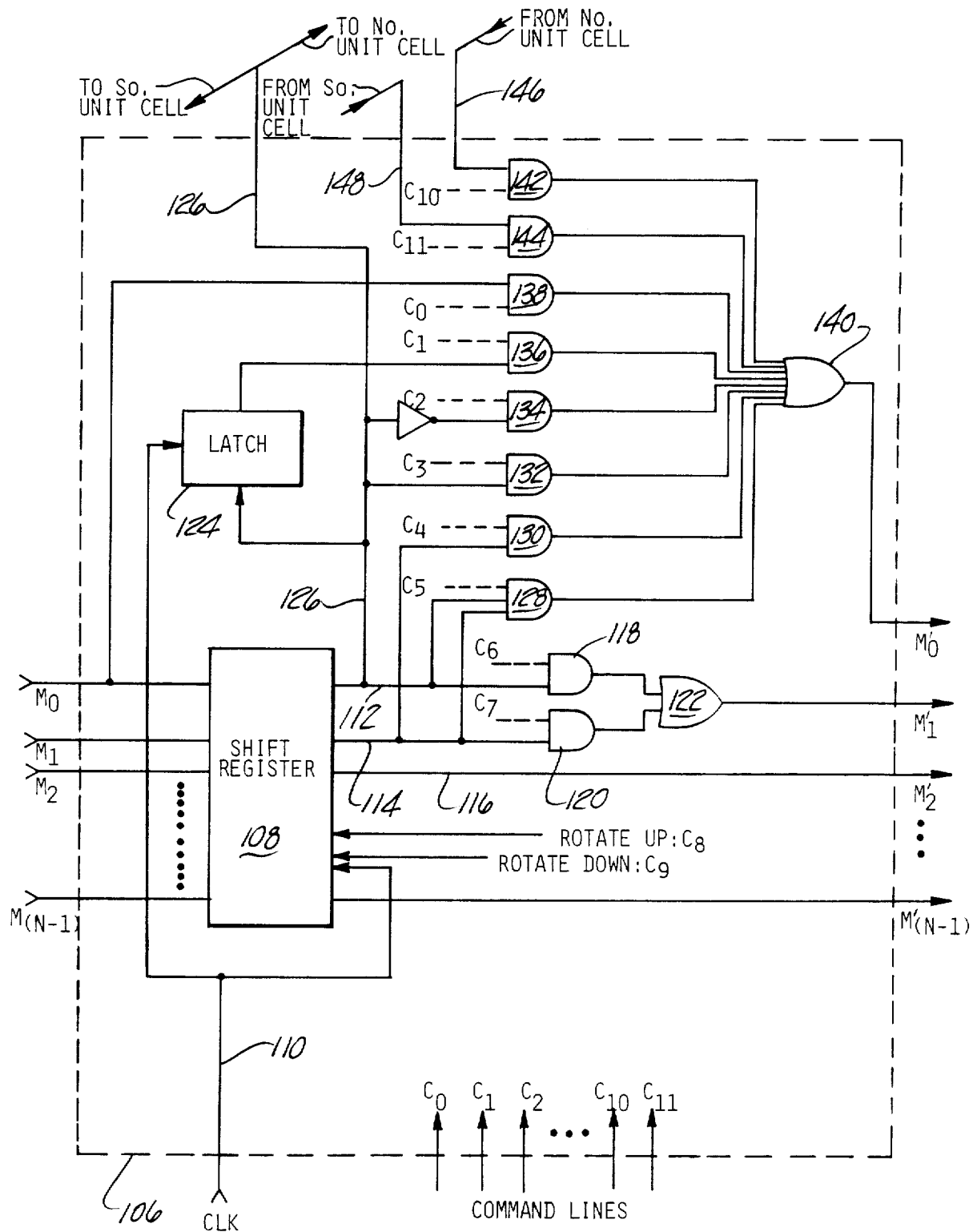
FIG. 4 is a combined block and detailed schematic diagram of one of the unit cells employed in the pipeline processor shown in FIG. 3; and, FIG. 5 is an alternate form of a unit cell suitable for use in the pipeline processor of the present invention.

Attention is now directed to FIG. 4 wherein the details of construction of one of the unit cells 92 is depicted within the broken line 106. The operation of unit cell 106 is controlled by a plurality of command lines $C_0$-$C_{11}$ operably coupled by a data bus to the memory-decoder 96 previously discussed with reference to FIG. 3. Unit cell 106 of FIG. 4 is quite similar in many respects to unit cells 10 shown in FIG. 2. Unit cell 106 includes a plurality of data input lines, designated as $M_0$-$M_{(N-1)}$, coupled with the data output lines of the upstream unit cell, and includes a plurality of data output lines, designated by $M'_0$-$M'_{(N-1)}$, which are operably coupled with the data inputs of the neighboring, downstream unit cell. The data input lines to unit cell 106 form the parallel data inputs to a memory element 108, which may comprise a shift register similar to that of unit cell 10. Memory element 108 receives clock signals on line 110 and is provided with a plurality of parallel output lines, such as lines 112, 114 and 116. Data output lines 112 and 114 form the inputs to a pair of AND gates 118 and 120, the output of which gates forms the input of an OR gate 122. A latch 124 receives data output from memory element 108 via lines 112 and 126 and is also operated by clock pulses received on line 110. The unit cell 106 further includes a processing section defined by a plurality of AND gates 128-138 as well as an OR gate 140. The components of unit cell 106 thus far described are essentially similar to those shown in FIG. 2. The processing section of unit cell 106 further includes two additional AND gates 142 and 144 whose outputs are coupled to the input of OR gate 140. The inputs to AND gate 142 are formed by command line input $C_{10}$ and a line 146 which is connected, via data bus 95 to line 126 of the neighboring north unit cell. One input of AND gate 144 is formed by command line $C_{11}$ while the other input thereto is connected via line 148 to line 126 of the neighboring, south unit cell, also via data bus 95. Line 126 also forms one line of the data bus 95 and is connected to line 146 of the neighboring north unit cell, as well as to line 148 of the neighboring, south unit cell.

It is thus apparent that data may be transferred in a north-south direction between neighboring cells in adjacent rows thereof, thereby substantially adding to operational flexibility in terms of the data transformation that may be performed. For example, when a signal is delivered on command line $C_{10}$, AND gate 142 transfers data from the neighboring north unit cell to the $M'_0$ output line. When a signal present on command line $C_{11}$, and gate 144 transmits data from the neighboring south unit cell on the $M'_0$ output line. When a signal is present on either command line $C_{10}$ or $C_{11}$, data is transferred from memory element 108 via line 126 to either the north or south, neighboring unit cell via the data bus 95.

Figure 5:
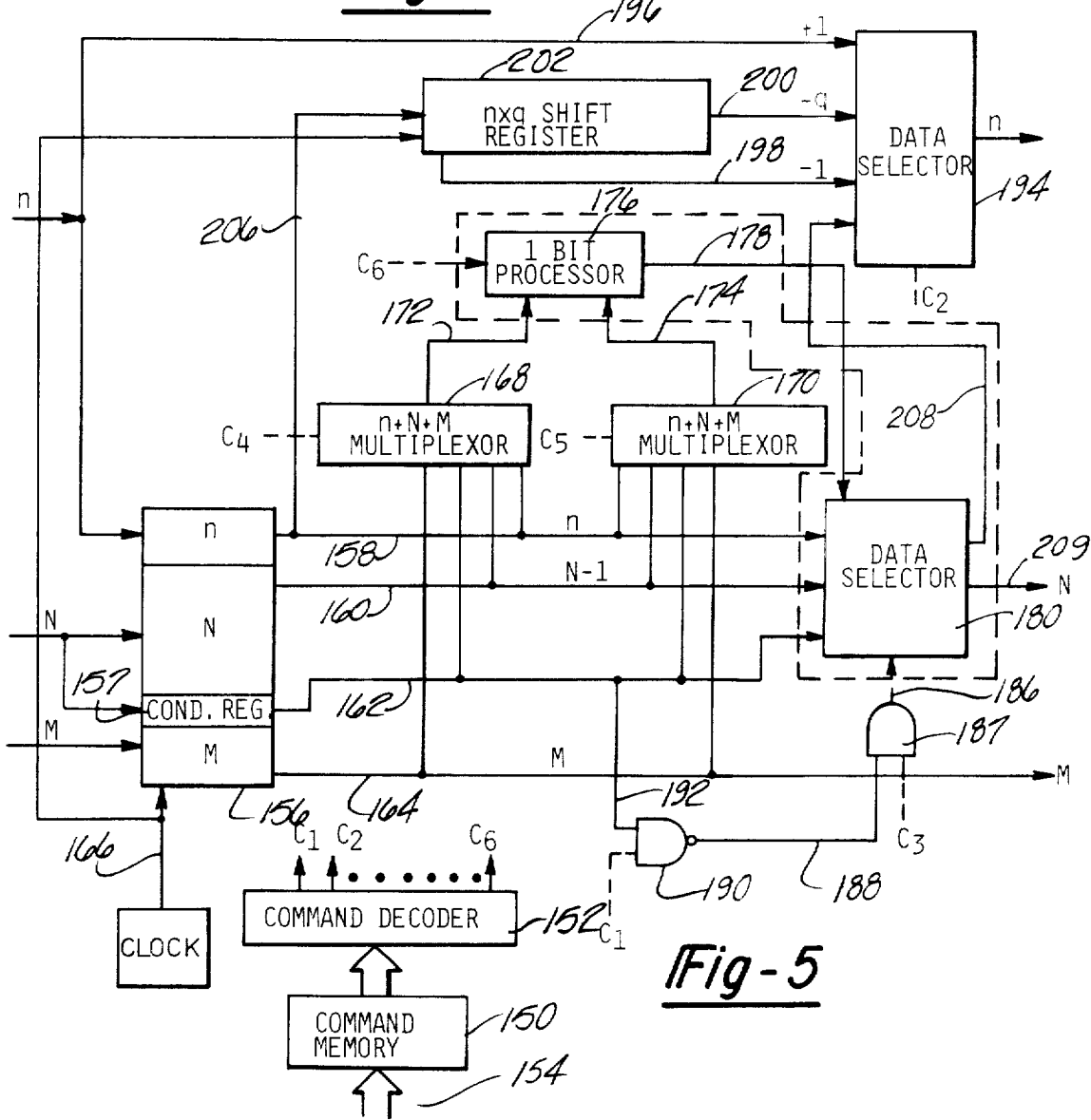

Attention is now directed to FIG. 5 wherein an alternate form of the unit cell suitable for use in the pipeline processor is depicted. This alternate form of the unit cell includes a command memory 150 for storing coded instructions therein, which is controlled by a controller (not shown) similar to that discussed with reference to FIG. 1. The controller delivers control signals by bus 154 to the command memory 150, and command instructions are delivered to a command decoder 152, whose outputs $C_1$–$C_6$, control the transfer of data from and within the unit cell. The unit cell further comprises data storage means, preferably in the form of a conventional "D" type latch 156 having a plurality of parallel input lines and a plurality of parallel output lines. The data input lines and data output lines of the unit cell are ranged in three groups thereof respectively designated as n, N, and M. Although indicated in the drawings as single lines, it will be understood that the letters n, N, and M designate a plurality of parallel lines. Data input lines n, N, and M form the parallel input lines of the latch 156, such that data is stored in latch 156 in separate groups corresponding to the groups of data input lines. Thus, latch 156 includes a n section, a N section, and a M section within which data received on the corresponding groups of data input lines is stored. The latch 156 also includes a condition register storage section 157 whose function will be discussed later. Data is received into storage in the latch 156 and is simultaneously output therefrom on output lines 158–164 in accordance with clock pulses derived on line 166. A pair of multiplex units 168 and 170 are coupled with each group of output lines 158–164 of the latch 156 and each of such multiplexers may therefore select data from any of the groups of lines 158–164 in accordance with command signals which are respectively delivered to multiplexers 168 and 170 by command lines $C_4$ and $C_5$. Multiplexers 168 and 170 may be of a conventional type such as that manufactured by the RCA Corporation and identified by the Manufacturer's Part. No. 4051. Multiplexed data output from multiplexers 168 and 170 are delivered on lines 172 and 174 to the input of a one-bit processor 176 which may comprise logic gates or the like. Command line $C_6$ determines which logic function is selected. The output of processor 176 is delivered on output line 178 to one input of a first data selector 180. Data selector 180 may comprise conventional gates and has a plurality of inputs coupled with the groups of output lines 158–162. A further input to the data selector 180 is formed by line 186 which is coupled to the output of AND gate 187. AND gate 187 has one input thereof coupled with command line $C_3$, a second input thereto being formed by the output of NAND gate 190 via line 188. NAND gate 190 has a pair of inputs respectively coupled to command line $C_1$ and data output line 162 via line 192.

Command lines $C_3$ serve to select which line in the group of input lines 158, 160 and 162 will be replaced by the processor output 178. Data on line 178 will appear on the selected output line in the group 208 or 209. All other unselected outputs will remain unchanged. A logic zero on line 188 will inhibit the select command $C_3$ thereby allowing all outputs 208 and 209 to remain the same as the corresponding inputs 158, 160 and 162.

The n group of input lines to the cell, in addition to being connected with the latch 156, are delivered to one input of a data selector 194 via line 196. Additional inputs to data selector 194 are formed by lines 198 and 200 derived from the output of an n-by-q shift register 202. Shift register 202 is driven by a clock 166 and has a data input coupled by line 206 to the n group of output lines 158 of latch 156. Data selector 194 has an output which forms the n group of data output lines of the unit cell while data selector 180 has an output forming the N group of output lines of the cell. The M group of output lines from the unit cell are received directly from the output line 164 of latch 156.

Data selector 194 may comprise a multiplexor, similar to multiplexers 168 and 170, which outputs data on the n group of data lines selected from one of the input lines 196, 198, 208 or 200 in accordance with instructions received via command line $C_2$. In terms of function, data selector 194 is similar to OR gate 84 and the associated AND gates 60–70 of the unit cell 10 of FIG. 2. Data delivered via line 196 to data selector 194 is selectively routed to the n group of output lines which deliver such data to the neighboring downstream unit cell to provide a look-ahead function similar to that provided by the unit cell 10 of FIG. 2. The shift register 202 also receives n type data via line 206 but temporarily stores the same so as to introduce a delay therein; this has the effect of providing data to the data selector 194 in a state in which it existed in upstream unit cells in the chain thereof, prior in time. More particularly, data delivered on line 198 is delayed one stage in the chain, while data delivered on line 200 is delayed several stages in the chain according to the length, q, of shift register 202. Additionally, N type data output on the data output lines 160 may also be selectively delayed by virtue of the fact that data selector 180 may be operated to replace the n type data delivered to an input of data selector 194 via line 208 with N type data received on line 160. In other words, N type data is transferred to the n group of input lines to the neighboring downstream unit cell via data selector 194, which may then be delivered through the latch thereof and to the corresponding shift register (similar to shift register 202) for appropriate time delay.

M type data on lines 164 may be received, or "read" by multiplexers 168 and 170 but is not "written out" as in the case of n and N type data. In some cases, it may not be necessary to transfer the data on the M group of lines.

The condition register portion 157 of latch 156 stores condition register data which controls the operation of data selector 180. A logical zero in the condition register section of latch 156 allows data selector 180 to operate in the manner previously described. However, a logical one in the condition register and on command line $C_1$ inhibits the data selector 180 from outputting any data on output lines 208 and 209. A logic zero on command line $C_1$ disables the controlling action of the condition register. The logical status of the condition register location 157 within latch 156 is controlled by data received from the upstream, neighboring cell on one of the N lines, as determined by command signals delivered on command lines $C_1$ and $C_3$. It can be appreciated that since the N group of input lines to the unit cell are controlled by the output of data selector 180, the logical state of the condition register is controlled by the data selector 180 associated with the upstream unit cell.

From the foregoing, it can be appreciated that the pipeline processor described herein not only provides for the reliable accomplishment of the objects of the invention but does so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A system for serially processing spatially oriented data, comprising
   a plurality of serially connected processing cells each including a multi-bit memory haing a data input for receiving an N-bit data word from another of said cells, a data output and a control input, and means coupled with said data output of said memory for temporarily storing data output from said memory,
   each of said cells further including a processing circuit for operating on selected bits of said data word, said processing circuit having a first input connected with the data output of said memory and a second input connected with said data storing means, said processing circuit having a data output connected with the data input of the neighboring downstream processing cell; and
   selecting means operably coupled with the control input of each of the memories and with the processing circuit of each of said cells for selecting the bits of said data word to be operated upon by said processing circuit.

2. The system of claim 1, wherein:
   said memory coprises shift register means,
   said data storing means comprises a latch, and
   said processing circuit includes a plurality of logic gates.

3. The system of claim 1, wherein said processing circuit comprises a multi-state circuit element having an output and a plurality of inputs and whose output state is a function of the states of the inputs thereof, one of said inputs of said circuit element being connected to the data output of the neighboring upstream processing cell.

4. The system of claim 3, wherein said circuit element comprises an OR gate and said processing circuit further includes a plurality of logic gates each having the output thereof coupled with one of said plurality of inputs of said circuit element, at least one input of each of said logic gates being operably coupled with said selecting means.

5. The system of claim 1, wherein said selecting means comprises means in each of said cells for storing and decoding command instructions at said cells.

6. A system for serially processing spatially oriented data, comprising:
   an array of processing cells defined by a plurality of interconnected rows of interconnected processing cells, each of said rows being adapted to serially process said data therethrough,
   each of said processing cells comprising—
   (1) a plurality of data inputs for receiving from another of said cells an N-bit data word related to said spatially oriented data, and a plurality of data outputs,
   (2) a multi-bit memory for storing said data word, said memory having data inputs, data outputs and a control input,
   (3) means coupled with one of the outputs of said memory for temporarily storing data output from said memory, said data storage means having a data output,
   (4) a processing circuit for operating on selected bits of said data word, said processing circuit having a plurality of inputs respectively operably coupled with said memory and with the output of said data storage means, the processing circuit in at least certain of said cells in each row thereof including an input coupled with a cell in each adjacent row thereof; and
   selecting means operably coupled with the control input of the memory and with the processing circuit of each of said cells for selecting the bits of said data word to be operated upon by said processing circuit.

7. The system of claim 6, wherein:
   said memory comprises shift register means,
   said data storage means comprises latch means, and
   said processing circuit comprises a logic circuit.

8. The system of claim 7 wherein said logic circuit of said certain cells comprises:
   a first gate having an output and a plurality of inputs,
   a plurality of second gates having outputs connected to the inputs of said first gate and each having a pair of inputs respectively connected with said selecting means and with a data output of a cell in an adjacent row thereof.

9. The system of claim 8, wherein said first gate comprises a logical OR and each of said second gates comprises a logical AND.

10. A unit cell for use in serially processing data, comprising:
    shift register means having a plurality of data inputs, a plurality of data outputs and a control input, operable for storing an N-bit data word therein;
    latch register means coupled with at least one of the data outputs of said shift register means for temporarily storing certain of the bits of said data word output from said shift register means;
    processing means for operating on selected bits of said data word, said processing means including a first input coupled with one of said data inputs of said shift register means, a second input coupled with one of said data outputs of said shift register means, and a third input coupled with said latch register means; and
    selecting means operably coupled with the control input of said shift register means and with at least one of said first, second and third inputs of said processing means for selecting the bits of said data word to be operated upon by said processing means.

11. The cell of claim 10, including a pair of logic gates each having an input coupled with one of the data outputs of said shift register means and having an output coupled with one of the data inputs of a neighboring downstream cell.

12. The cell of claim 11, including a third logic gate having inputs coupled with the output of each of said pair of logic gates.

13. The cell of claim 10, wherein said processing means comprises a plurality of logic gates, a first gate being coupled to the selecting means and to said first input, a second gate being coupled to the selecting means and said second input, and a third gate being coupled to the selecting means and said third input; and outputs of the logic gates being coupled to inputs of a fourth logic gate whose output provides an output of the cell.

14. A unit cell for use in an interconnected chain thereof employed to serially process data, comprising:
    data storage means having a first, second and third data input adapted to be coupled with an upstream unit cell in said chain thereof, and including first, second and third data storage locations respectively coupled with said first, second and third data inputs for storing corresponding first, second and third groups of data therein received from said upstream unit cell, said data storage means further including first, second and third data outputs for outputting said first, second and third groups of data;

first and second multiplexor means each operably coupled with each of said first, second and third data outputs of said data storage means and each operative for multiplexing data delivered on said last named data outputs;

first processing means having a plurality of data inputs including a first data input coupled with said upstream unit cell, a second data input operatively associated with said first data output of said storage means and a third data input, said first processing means further including a control input and data output coupled with the first data input of the data storage means of the downstream unit cell in said chain thereof, said first processing means being operative for selectively delivering data from one of its data inputs to its data output in accordance with the state of said control input; and second processing means having first data input means coupled with each of said first and second multiplexors and a second and third data input respectively coupled with said first and second data outputs of said data storage means, said second processing means further having a control input and first and second data outputs respectively coupled with said third data input of said first processing means and with said second data input of said downstream unit cell and being operative to selectively deliver data from said third data input thereof to one of said first and second data outputs thereof in accordance with the state of said control input of said second processing means.

15. The cell of claim 14, wherein said data storage means comprises a latch.

16. The cell of claim 14, including means operatively coupled with said first and second multiplex means and with said first and second processing means for controlling the transfer of data within said cell and from said cell to said downstream cell.

17. The cell of claim 14, including means coupled between said first data output of said data storage means and said second data input of said first processing means for temporarily holding data output from said data storage means.

18. The cell of claim 17, wherein said means for temporarily holding data comprises a shift register.

19. A system for serially processing data comprising:

a plurality of serially connected data processing cells each having first and second groups of data inputs and data outputs for respectively receiving and delivering first and second groups of data, each of said cells including;

(1) data storage means operatively coupled with said first and second groups of data inputs for temporarily storing said first and second groups of data therein, said data storage means including first and second groups of data outputs for outputting said first and second groups of data stored therein, (2) multiplex means operatively coupled with each of said first and second groups of data outputs of said data storage means for multiplexing said first and second groups of data, (3) first processing means having data inputs coupled with said first and second groups of said data outputs of said data storage means and with said multiplex means, said first processing means further including a control input and first and second data outputs operative for selectively delivering data received on said second group of data output lines of said data storage means to either of said first and second data outputs of said first processing means in accordance with the state of said control input, one of said first and second data outputs forming said second group of data outputs of said processing cell, (4) second processing means having data inputs coupled with the first group of data outputs of an upstream cell, with said first group of data outputs of said data storage means and with one of said outputs of said first processing means, for selectively delivering data to a downstream processing cell.

20. The system of claim 19, wherein:

said data storage means comprises a latch, said multiplex means comprises a first and second multiplex device, and said first processing means comprises first and second interconnected processing elements, said first processing element being coupled with said first and second multiplex devices, said second processing element being coupled with said first and second groups of data outputs of said data storage means.

21. The system of claim 20, wherein said second processing means includes shift register means for storing and delaying data transferred to said downstream processing cell.

* * * * *